United States Patent [19]
Brzyski et al.

[11] Patent Number: 5,429,155
[45] Date of Patent: Jul. 4, 1995

[54] CRYOGENIC FLUID COUPLING

[75] Inventors: Glenn M. Brzyski, Depew; Martin E. Gordon, Clarence; Patrick K. Griffin, Cowlesville, all of N.Y.; John J. Holzinger, Can Gabriel, Calif.

[73] Assignee: Moog Inc., East Aurora, N.Y.

[21] Appl. No.: 64,823

[22] Filed: May 19, 1993

[51] Int. Cl.6 .............................................. F16L 37/28
[52] U.S. Cl. ..................... 137/614.04; 251/149.6; 62/50.7; 285/904
[58] Field of Search ...................... 137/614.04, 614.03, 137/614.02, 614, 614.05; 285/904, 308, 311, 312; 62/50.7, 299; 251/149.6, 149.9, 149.1

[56] References Cited

U.S. PATENT DOCUMENTS

| | | | |
|---|---|---|---|
| 1,819,672 | 8/1931 | Cain | 137/614.06 |
| 2,461,705 | 2/1949 | Stranberg | 137/614.04 |
| 3,842,614 | 10/1974 | Karcher et al. | 137/614.04 X |
| 3,874,411 | 4/1975 | Vik | 137/614.06 |
| 4,347,870 | 9/1982 | Maldavs | 137/614.05 |
| 4,676,269 | 6/1987 | Sarson | 137/614.06 |
| 5,265,844 | 11/1993 | Westfall | 251/149.6 X |

Primary Examiner—Martin P. Schwadron
Assistant Examiner—Kevin L. Lee
Attorney, Agent, or Firm—Phillips, Lytle, Hitchcock, Blaine & Huber

[57] ABSTRACT

A fluid coupling (30) has a male half (32) and a female half (31). Each half has a poppet (35,42) arranged to move toward and way from a seat (34,43). The male half (32) has an outer sleeve (38) which is adapted to guide initial joinder of the female half distal end (46). After the two halves have been initially joined, the male half body (39) is extended relative to the sleeve (38) so as to move both poppets (35,42) off their respective seats and to permit flow through the coupling. The coupling has protrusions (76) provided with sharpened edges which are positioned to scrape ice adhering to facing surfaces when the coupling halves are joined and separated.

23 Claims, 6 Drawing Sheets

CRYOGENIC FLUID COUPLING

TECHNICAL FIELD

This invention relates generally to the field of fluid couplings, and, more particularly, to an improved coupling having separable male and female halves and which is adapted to handle fluids at sub-freezing or even cryogenic temperatures.

BACKGROUND ART

Very cold fluids at cryogenic temperatures (i.e. less than −150° C.) pose special handling problems, principally because the temperature of such fluids will quickly lower the temperature of any valve or coupling through which they flow When such a coupling is used to transfer a cryogenic fluid, freeze-up problems may occur if the transfer takes place in a moist or high-humidity environment. Any water within, or immediately outside of, the coupling will quickly freeze, thereby potentially impeding subsequent movement of mechanical parts within the coupling. Moreover, successive transfers from a fluid source with the same pre-chilled coupling half to mating coupling halves communicating with different receptacles at warmer ambient temperatures, have been known to result in freeze-up and leakage because of ice formation at the sealing surfaces.

These two problems have come to the forefront in the area of liquefied natural gas (LNG). In order for LNG to be considered as a viable alternative automotive fuel, it must be easily transferred to the vehicle in which it will be used. In addition, it would be generally desirable that the fuel storage tanks on such vehicles be refilled as quickly as possible. This leads to the prospect of multiple quickly-successive short-duration transfers of LNG, at cryogenic temperatures, between a chilled nozzle and a warm receptacle in a potentially-moist environment. Hammer-type fittings would not be appropriate in this situation because of the high number of cycles the coupling must endure between maintenance cycles. In addition, the couplings should be small and light-weight so that they may be readily joined and separated by a low-strength operator.

Various types of couplings for handling such cryogenic fluids have been developed. Many of these have recognized the problem of ice formation. For example, U.S. Pat. No. 3,116,943 appears to disclose a quick disconnect-type of cryogenic coupling having a male half adapted to be selectively inserted into, and withdrawn from, a female half. Because of the problem of icing, a lever yoke is provided to magnify the operator's manual strength.

U.S. Pat. No. 3,842,614 discloses another form of quick disconnect-type of cryogenic coupling having mating male and female halves. Each half has a poppet-type check valve arranged to move automatically to a flow-permitting position when the halves are joined, and arranged to close the flow passageway when the two halves are separated. This patent clearly identifies the problem of ice formation both within and without the coupling, and posits, as one possible solution to the problem, the removal of two-thirds of the coupling balls to provide receptacles for ice.

Additional details as to other cryogenic couplings may be found in U.S. Pat. Nos. 4,309,049, 4,149,388 and 3,988,029.

DISCLOSURE OF THE INVENTION

With parenthetical reference to the corresponding parts, portions or surfaces of the disclosed embodiment, merely for purposes of illustration, and not by way of limitation, the invention provides, in one aspect, an improvement in a self-sealing female or male fluid coupling half (31 or 32) which is adapted to convey a fluid at a sub-freezing temperature. The coupling half (31 or 32) includes a tubular body (33 or 39) having an inner surface (61 or 136) and an internal annular seat (34 or 41), and includes a poppet (35 or 42) mounted within said body for relative movement toward and away from the seat. The improvement comprises: the poppet (35 or 42) having an outer surface (71 or 71') arranged in spaced facing relation to said body inner surface (61 or 136), and having at least one protrusion (75,76 or 75',76') extending outwardly from one of the surfaces (71 or 71') toward the other of the surfaces. This protrusion terminates in distal surfaces (78,75 or 78',75') which are arranged to slidably engage the other surface (61 or 136). The protrusion has an outer edge configured and arranged as a scraper (78,79, 78,80, 74,75 or 78',79', 78',80', 74',75') for removing ice adhering to said body inner surface (61 or 136) when the poppet (35 or 42) is moved relative to said body (33 or 39).

In another aspect, the invention provides a coupling (30) which is adapted to convey a fluid at sub-freezing temperatures. This coupling broadly comprises: a female coupling half (31) having a tubular body (33) terminating in a distal end (46), the female half body having an inner surface (61), an outer surface (51) and an internal annular abutment surface (59); a male coupling half (32) including an outer tubular sleeve (38) having an inner surface (105) and having an internal annular projection (108), and including an inner tubular body (39) concentrically arranged within the sleeve for axial movement relative thereto, the male half body having a distal end face (110) and having an outer surface (120) arranged in spaced facing relation to the sleeve inner surface (105) so as to form an annular recess (157) therebetween which extends between the male half body distal end (110) and the sleeve projection (108), the distal marginal end (46) of the female half body (33) being axially insertable into the male half recess (157) until the female half distal end (46) abuts said male half projection (108); a holding mechanism (165) for preventing unintended separation of the joined coupling halves; and a lever (40,143) for selectively moving the male half body (39) relative to the male half sleeve (38) in a direction toward said female half abutment surface (59).

In still another aspect, the invention provides a fluid coupling (30) adapted to convey fluid at a sub-freezing temperature, this coupling having a first member (e.g., 33) provided with a concave arcuate surface (e.g., 61) generated about an axis (e.g., x—x) and having a second member (e.g., 35) provided with a coaxial convex arcuate surface (e.g., 71) arranged in spaced facing relation to the concave arcuate surface, the members being mounted for relative axial movement, the improvement which comprises: a protrusion (e.g., 76) extending from one of the arcuate surfaces toward the other of the arcuate surfaces, the protrusion having a first side surface (e.g., 79) facing in one axial direction and having a second side surface (e.g., 80) facing in the opposite axial direction, said protrusion also having a coaxial distal arcuate surface (e.g., 78) slidably engaging the other arcuate surface and joining the margins of the first and second side surfaces, the first side surface defining with the distal arcuate surface a first edge adapted to scrape ice adhering to the other arcuate surface when the protrusion-carrying member is moved in said one axial direction relative to the other member, and the second side surface defining with the distal arcuate surface a second edge adapted to scrape ice adhering to the other arcuate surface when the protrusion-carrying member is moved in the opposite axial direction; whereby the area in sliding contact between the two members may be reduced.

Accordingly, the general object of the invention is to provide an improved fluid coupling for handling cryogenic fluids.

Another object is to provide an improved cryogenic fluid coupling which is adapted for use in filling a plurality of LNG storage tanks at ambient temperatures.

Still another object is to provide an improved cryogenic fluid coupling which accommodates the presence of ice within and without the coupling, and which provides for ice removal at various critical regions during operation.

These and other objects and advantages will become apparent from the foregoing and ongoing written specification, the drawings and the appended claims.

DESCRIPTION OF THE PREFERRED EMBODIMENT(S)

At the outset, it should be clearly understood that like reference numerals are intended to identify the same structural elements, portions or surfaces consistently throughout the several drawing figures, as such elements, portions or surfaces may be further described or explained by the entire written specification of which this detailed description is an integral part. Unless otherwise indicated, the drawings are intended to be read (e.g., arrangement of parts, mounting, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to its axis of elongation, or axis or rotation, as appropriate.

Figure 1:
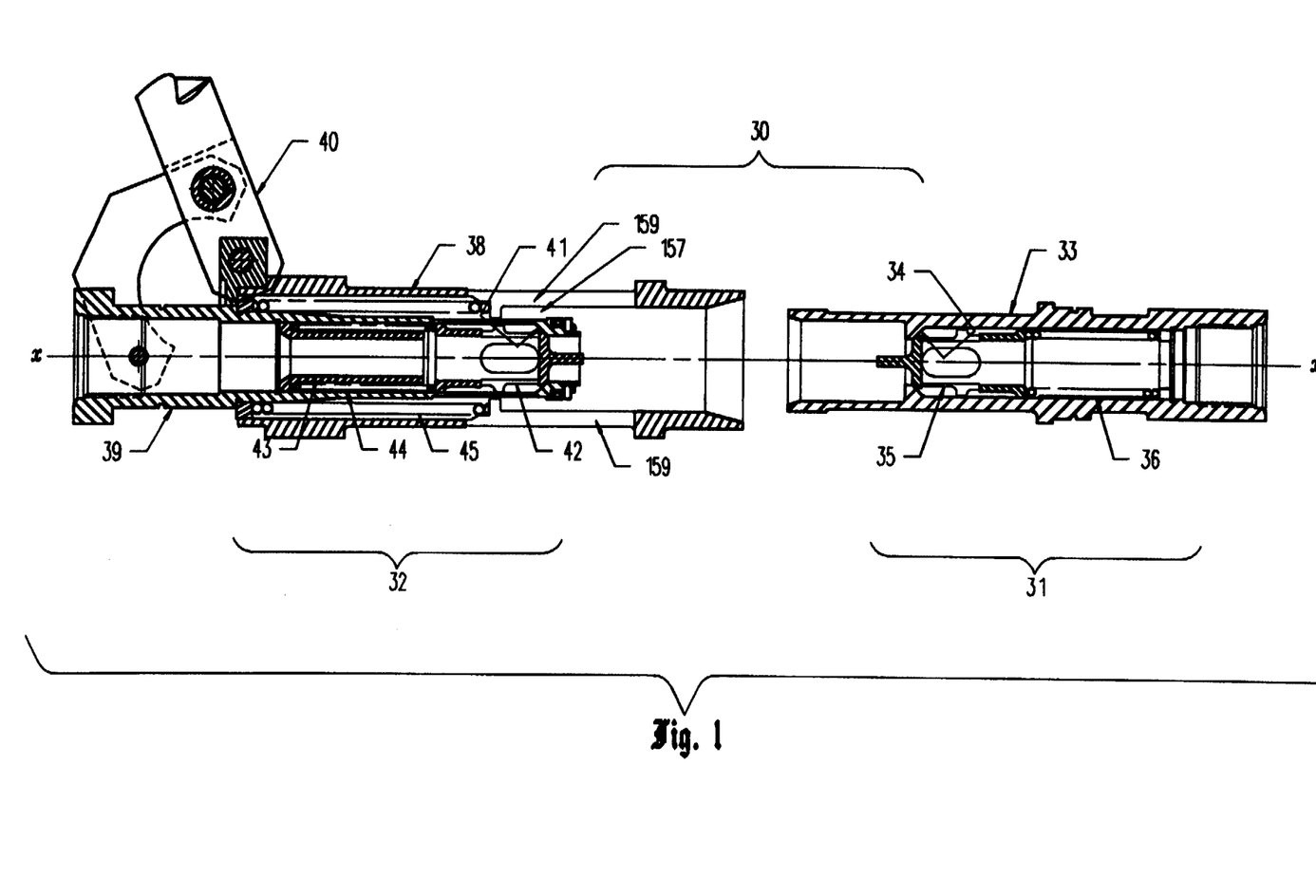
FIG. 1 is a fragmentary longitudinal vertical sectional view of one form of the improved coupling, this view showing the separated male half as being axially aligned with the female section, prior to insertion and engagement.

Referring now to the drawings, and, more particularly, to FIG. 1 thereof, the present invention provides several improvements in a coupling, generally indicated at 30, which is adapted to convey a fluid at a sub-freezing temperature. In some cases, the fluid may be at a cryogenic temperature (i.e., at a temperature below −150° C.). The improved coupling 30 is shown as broadly including a rightward female coupling half, generally indicated at 31, and a leftward male coupling half, generally indicated at 32.

The female coupling half 31 is shown as including a horizontally-elongated tubular body 33 having a rightwardly-facing internal annular seat 34, a poppet 35 arranged within body 33 for movement toward and away from seat 34, and a spring 36 acting between the body and the poppet for continuously urging poppet 35 to move leftwardly into fluid-tight sealed engagement with seat 34.

The male coupling half 32 is shown as having a horizontally-elongated outer tubular sleeve 38, a horizontally-elongated tubular body 39 arranged within outer sleeve 38 for movement relative thereto, and a lever 40 operatively arranged to selectively move the inner body 39 relative to outer sleeve 38. The male half body is shown as having a leftwardly-facing internal annular seat 41, a poppet 42 arranged within body 39 for movement toward and away from seat 41, a stop member 43 mounted within body 39 to the left of the poppet, and a spring 44 acting between body 39 and poppet 42 for urging the poppet to move rightwardly relative to the body into fluid-tight sealed engagement with seat 41. Another coil spring 45 acts between outer sleeve 38 and body 39 for continually urging the body to move leftwardly relative to sleeve 38 to a fully-retracted position, as shown in FIG. 1.

The structure and operation of the improved coupling will be described seriatim herebelow.

Figure 2:
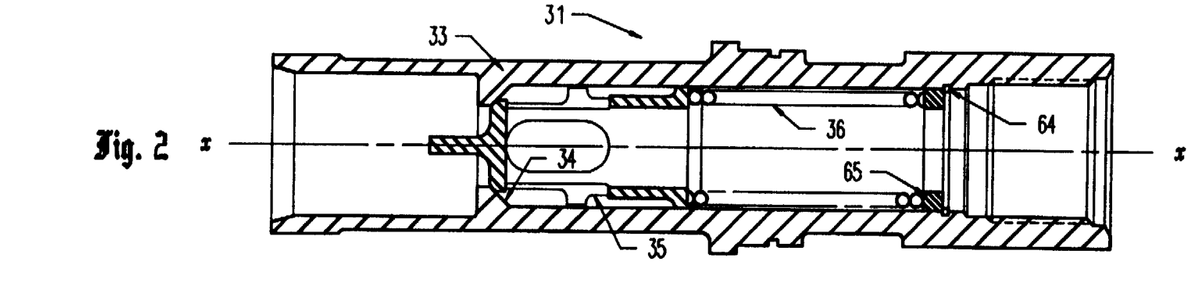
FIG. 2 is an enlarged fragmentary longitudinal vertical sectional view of the female coupling half shown in FIG. 1.
Figure 3:
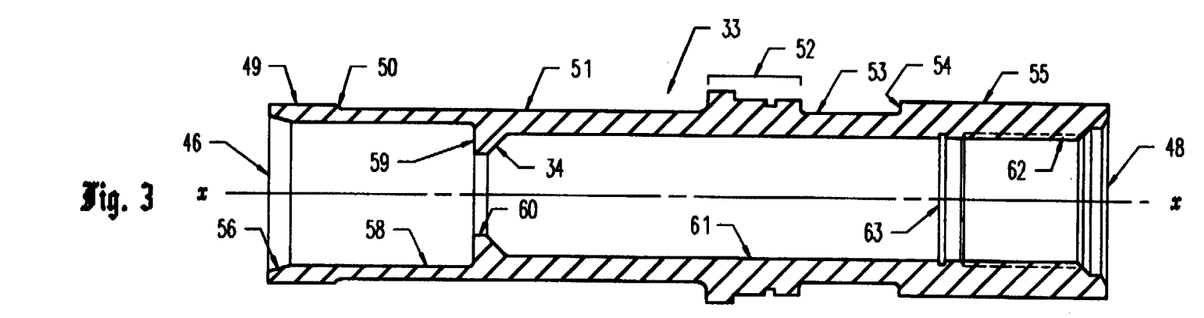
FIG. 3 is a fragmentary longitudinal vertical sectional view of the female half body shown in FIG. 2.
Figure 4:
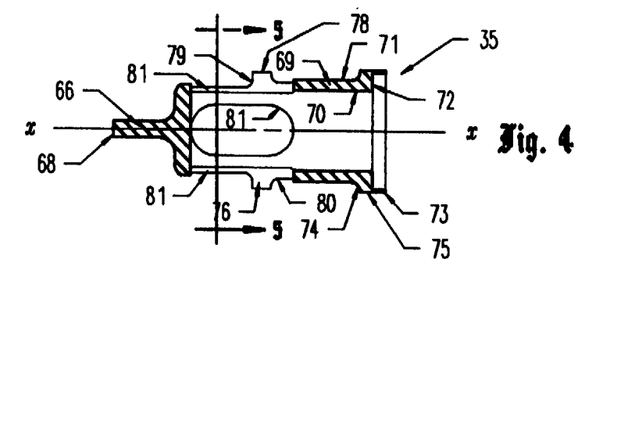
FIG. 4 is a fragmentary longitudinal vertical sectional view of the female half poppet shown in FIG. 2.

Female Coupling Half 31 (FIGS. 2-4)

Referring now to FIGS. 2 and 3, the female half body 33 is again shown as being a specially-configured tubular member elongated along horizontal axis x—x, having an annular vertical left end face 46, and an annular vertical right end face 48. Body 33 has an outer surface which sequentially includes, in pertinent part: a horizontal cylindrical surface 49 extending rightwardly from the outer margin of left end face 46; a rightwardly-facing concave annular surface 50; a horizontal cylindrical surface 51; a stepped portion, collectively indicated at 52, by which the female half body may be attached or secured to other structure (not shown in FIGS. 2-4); a horizontal cylindrical surface 53; a leftwardly-facing annular vertical surface 54; and a horizonal cylindrical surface 55 continuing rightwardly therefrom to join the outer margin of right end face 48. Body 31 is further provided with a stepped axial through-bore which sequentially includes (from left-to-right): an inwardly- and leftwardly-facing frusto-conical surface 56 extending rightwardly from the inner margin of left end face 46, a horizonal cylindrical surface 58, a leftwardly-facing annular vertical surface 59, a horizontal cylindrical surface 60, a rightwardly- and inwardly-facing frusto-conical surface forming seat 34, a horizontal cylindrical surface 61, and an internally-threaded portion 62 continuing rightwardly therefrom to join the inner margin of right end face 48. Threaded portion 62 is adapted to engage a suitable conduit (not shown) communicating with a source of (not shown), or appliance for (not shown), the serviced fluid.

As best shown in FIGS. 2 and 3, an annular groove 63 extends radially into body 33 from surface 61 to receive and accommodate a retaining ring 64 by means of which a disk-shaped member 65 may be prevented from moving rightwardly relative to the body.

Figure 5:
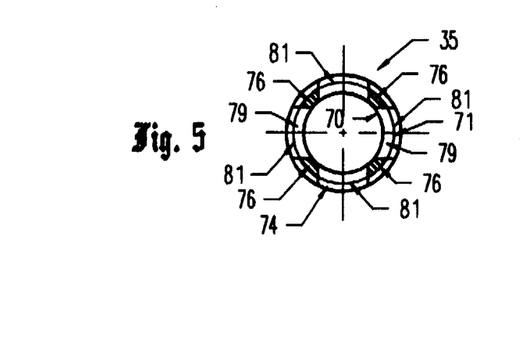
FIG. 5 is a fragmentary transverse vertical sectional view of the female half poppet, taken generally on line 5—5 of FIG. 4, showing the intermediate and rightward-most protrusions extending radially outwardly from the poppet side wall.

Referring now to FIG. 4, the female half poppet 35 is shown as being a specially-configured cup-shaped member, elongated along horizontal axis x—x, having a stem portion 66 extending leftwardly and terminating in a distal end 68. The poppet has a thin-walled cylindrical side wall 69 extending between an inner horizontal cylindrical surface 70 and an outer horizontal cylindrical surface 71. Inner surface 70 terminates in a rightwardly-facing annular vertical shoulder 72, from which a radially-thin annular flange 73 extends further rightwardly. An annular concave surface 74 joins outer cylindrical surface 71 with a radially-enlarged cylindrical surface 75 on flange 73. Intermediate its longitudinal extent, poppet member 35 is provided with a plurality of protrusions, severally indicated at 76, which extend radially outwardly in the form of cylindrical segments from poppet outer surface 71 and which terminate in outermost cylindrically-segmented distal arcuate surfaces 78 adapted to slid ably engage female half body inner surface 61. Protrusion outer surfaces 78 are joined to poppet outer surface 71 by annular left and side right surfaces 79,80, respectively. Left side surface 79 appears to have an annular concave surface tangentially joining poppet outer surface 71, and a leftwardly-facing annular vertical surface extending outwardly therefrom to perpendicularly join the left margin of protrusion distal arcuate surface 78. Right side surface 80 is in the form of a concave arcuate surface which tangentially joins poppet outer surface 71 and which perpendicularly joins the right margin of protrusion distal arcuate surface 78. As best shown in FIG. 5, the poppet is further provided with four circumferentially-spaced axially-elongated oval-shaped through-slots, severally indicated at 81, which are arranged between intermediate protrusion segments 76. The outer edges defined by intermediate protrusion surfaces 78,79, and rightward protrusion surfaces 74,75 form sharp-edged scrapers for removing ice adhering to female half body inner surface 61 when female half poppet 35 is moved leftwardly toward seat 34. Similarly, intermediate protrusion surfaces 80,78 form a rightwardly-facing sharp-edged scraper which is adapted to remove ice from body inner surface 61 when the female half poppet is moved rightwardly away from seat 34.

As best shown in FIG. 2, coil spring 36 acts between disk member 65 mounted fast to the body, and poppet shoulder 72, and continuously urges the poppet to move leftwardly relative to the body and toward fluid-tight sealed engagement with seat 34.

The female coupling half is assembled as shown in FIGS. 1 and 2. When separated from the male half, spring 36 will expand to urge poppet 35 into fluid-tight sealed engagement with scat 34. Thus, when the two coupling halves are separated, poppet 35 will close automatically. In the preferred embodiment, intermediate protrusions 76 are in the form of annular segments, while the rightwardmost protrusion is shown as being an annular member. This rightward protrusion could also be in the from of a plurality of arcuate segments as well, if so desired. It should also be noted that, alternatively, the protrusions could be mounted on the body and could extend toward the poppet, if desired.

Male Coupling Half 32 (FIGS. 6-10)

Figure 6:
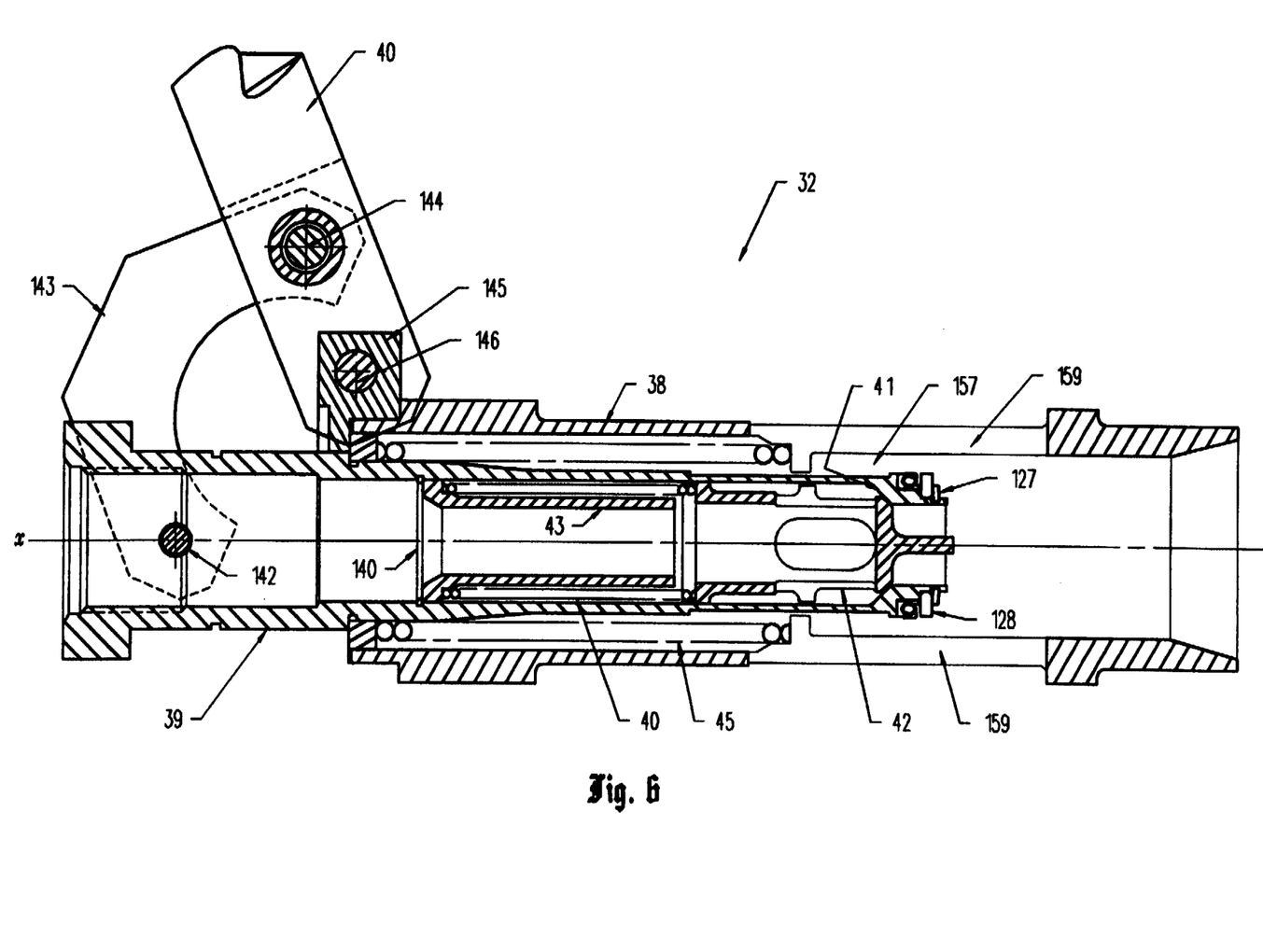
FIG. 6 is an enlarged fragmentary longitudinal vertical sectional view of the male coupling half shown in FIG. 1, this view showing the body as having been fully retracted within the outer tubular sleeve.
Figure 7:
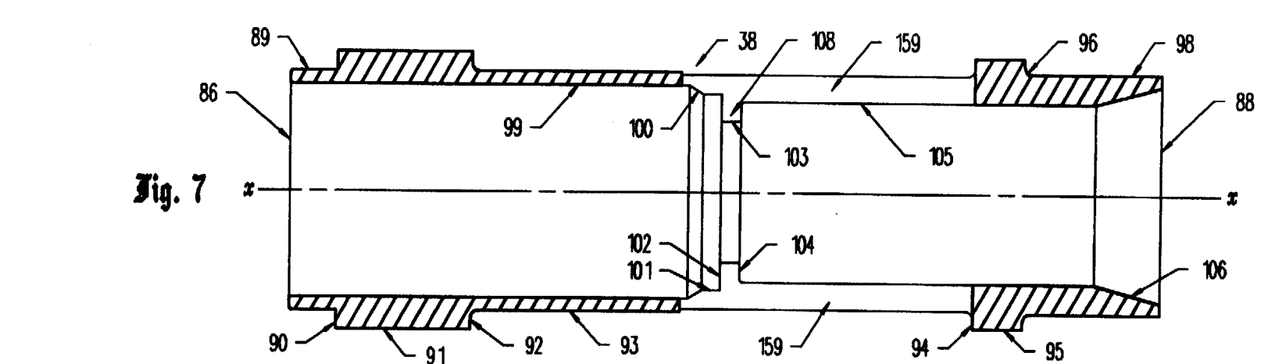
FIG. 7 is a fragmentary longitudinal vertical sectional view of the male half outer tubular sleeve shown in FIG. 6.

As best shown in FIGS. 6 and 7, the male half sleeve 38 is a specially-configured tubular member, elongated along horizontal axis x—x, having an annular vertical left end face 86, and an annular vertical right end face 88. The sleeve outer surface includes a horizontal cylindrical surface 89 extending rightwardly from the outer margin of left end face 86, a leftwardly-facing annular vertical surface 90, a horizontal cylindrical surface 91, a rightwardly-facing concave arcuate surface 92, a horizontal cylindrical surface 93, a leftwardly-facing annular vertical surface 94, a horizontal cylindrical surface 95, a rightwardly-facing concave arcuate surface 96, and a horizontal cylindrical surface 98 continuing rightwardly therefrom to join the outer margin of right end face 88. Surfaces 94 and 96 perpendicularly join outer arcuate surface 95. Sleeve 38 is also shown as having a stepped inner surface which sequentially includes (from left-to-right: a horizontal cylindrical surface 99 extending rightwardly from the inner margin of left end face 86, a leftwardly- and inwardly-facing frusto-conical surface 100, a horizontal cylindrical surface 101, a leftwardly-facing annular vertical surface 102, a horizontal cylindrical surface 103, a rightly-facing annular vertical surface 104, a horizontal cylindrical surface 105, and a rightwardly- and inwardly-facing frusto-conical surface 106 continuing rightwardly therefrom to join the inner margin of right end face 88. Surfaces 102, 103 and 104 form an internal annular projection 108 on the female half body.

Figures 8, 9, 10:
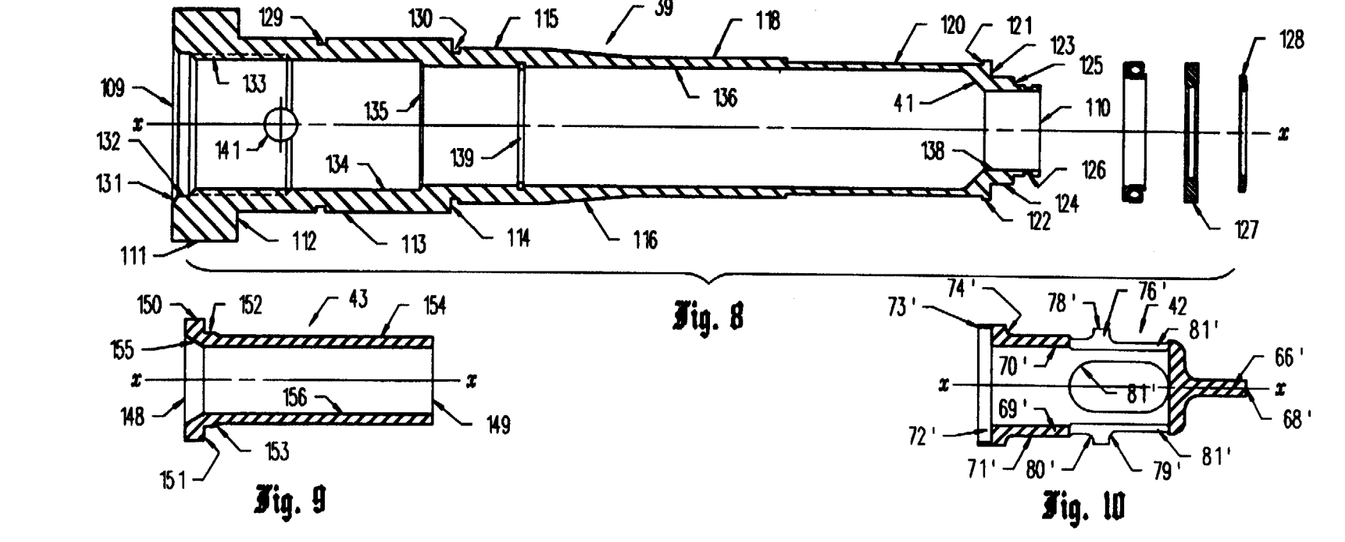
FIG. 8 is a fragmentary longitudinal vertical sectional view of the male half body shown in FIG. 6, with the seal, seal retainer and retaining ring being shown in exploded aligned relation thereto.
FIG. 9 is a fragmentary longitudinal vertical sectional view of the male half stop member shown in FIG. 6.
FIG. 10 is a fragmentary longitudinal vertical sectional view of the male half poppet shown in FIG. 6.

Referring now to FIG. 8, body 39 is also shown as being a specially-configured tubular member, also elongated along horizontal axis x—x, having an annular vertical left end face 109, and an annular vertical right end face 110. The outer surface of body 39 sequentially includes: a horizontal cylindrical surface 111 extending rightwardly from the outer margin of left end face 109, a rightwardly-facing annular vertical surface 112, a horizontal cylindrical surface 113, a rightwardly-facing annular vertical surface 114, a horizontal cylindrical surface 115, a rightwardly- and outwardly-facing frusto-conical surface 116, a horizontal cylindrical surface 118, a rightwardly-facing annular vertical surface 119, a horizontal cylindrical surface 120, a leftwardly-facing annular vertical surface 121, a horizontal cylindrical surface 122, a rightwardly-facing annular vertical surface 123, a horizontal cylindrical surface 124, a rightwardly-facing annular vertical surface 125, and a horizontal cylindrical surface 126 continuing rightwardly therefrom to join the outer margin of right end face 110.

An annular groove extends radially into body 39 from surface 126 to receive and accommodate a retaining ring 127 (FIG. 6), which holds the inner surface of a disklike seal retainer 128 against surface 126. Other annular vertical grooves, indicated at 129 and 130, respectively, extend into body member 39 from surfaces 113, 115, respectively, to similarly receive other retaining rings (not shown in FIGS. 6–10) by means of which the other structure may be mounted thereon. Body 39 is also shown as having a stepped horizontal through-bore, which is sequentially bounded by: a leftwardly- and inwardly-facing frusto-conical surface 131 extending rightwardly from the inner margin of left end face 109, a horizontal cylindrical surface 132, an internally-threaded portion 133, a horizontal cylindrical surface 134, a leftwardly- and inwardly-facing frusto-conical surface 135, a horizontal cylindrical surface 136, a leftwardly- and inwardly-facing frusto-conical surface forming seat 41, and a horizontal cylindrical surface 138 continuing rightwardly therefrom to join the inner margin of fight end face 110. Threaded portion 133 is adapted to mate with a complimentarily-configured fitting (not shown) on the distal end of a conduit (not shown) which communicates with a source of (not shown), or appliance for (also not shown), the serviced fluid.

An annular groove 139 (FIG. 8) extends radially into the body from surface 136 to receive and accommodate a retaining ring 140 (FIG. 6) by which the stop member may be mounted on the body.

A diametrical hole 141 is provided through body 39 between threaded portion 133 and surface 134 to receive and accommodate a pin 142 (FIG. 6) by which a C-shaped link 143 may be attached to the body. This link is one branch of an inverted U-shaped yoke member, having its upper end pivotally connected, as indicated at 144, to an intermediate portion of lever 40. Lever 40 has its lower marginal end portion pivotally mounted in a sleeve block 145 for rotation about pivotal axis 146. Thus, as seen in FIG. 6, when lever 40 is moved in a counter-clockwise direction, the male half body 39 will be retracted (i.e., moved leftwardly) relative to outer sleeve 38. Conversely, when the lever is moved in a clockwise direction, the male half body will be extended (i.e., moved rightwardly) relative to sleeve 38.

As best shown in FIG. 9, stop member 43 is a specially-configured horizontally-elongated tubular member having an annular vertical left end face 148, and an annular vertical right end face 149, and an outer surface which sequentially includes: a horizontal cylindrical surface 150 extending rightwardly from the outer margin of left end face 148, a rightwardly-facing annular vertical surface 151, a horizontal cylindrical surface 152, a rightwardly- and outwardly-facing frusto-conical surface 153, and a horizontal cylindrical surface 154 continuing rightwardly therefrom to join the outer margin of right end face 149. The stop member also has an axial through-bore which is sequentially bounded by: a leftwardly- and inwardly-facing frusto-conical surface 155 extending rightwardly from the inner margin of left end face 148, and a horizontal cylindrical surface 156 continuing rightwardly therefrom to join the inner margin of right end face 149.

As best shown in FIG. 10, the female half poppet 42 is structurally identical to male half poppet 35, although one is arranged as a mirror image of the other. In as much as male half poppet 35 has already been described, the primes of the same reference numerals have been applied to the corresponding parts, portions or surfaces of the female poppet member.

The male coupling half is assembled as shown in FIGS. 1 and 6. Spring 45 urges the male half body 39 to retract within sleeve 38. When separated from the female half, spring 40 will expand to urge poppet 42 into fluid-tight sealed engagement with seat 41. When the male half body 39 is retracted within sleeve 38, as shown in FIGS. 1 and 6, the right marginal end portion of the male half sleeve embraces the left marginal end portion of the female half body as the two halves are brought together. This serves to align and guide the twice halves during closure, and is enhanced by the guiding action of frusto-conical surface 106. Here again, the position of the protrusions 76,76' could be reversed, if so desired.

Figure 11:
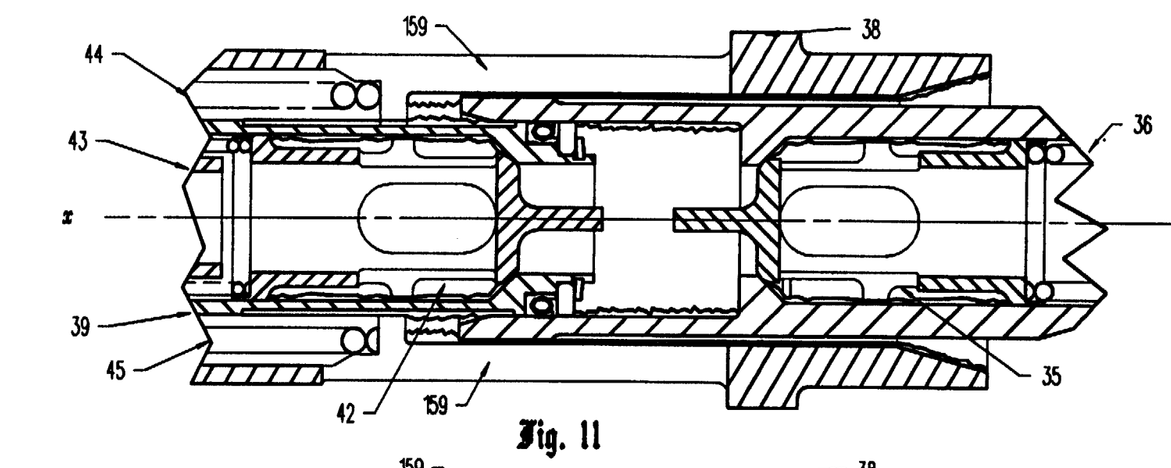
FIG. 11 is an enlarged fragmentary longitudinal vertical sectional view thereof, showing the leftward distal end of the female half body as having been inserted into the male half recess so as to initially position and align the two coupling halves prior to operation of the male half lever, this view also showing the retaining ring as scraping ice from the female half body as the two coupling halves are brought together.
Figure 12:
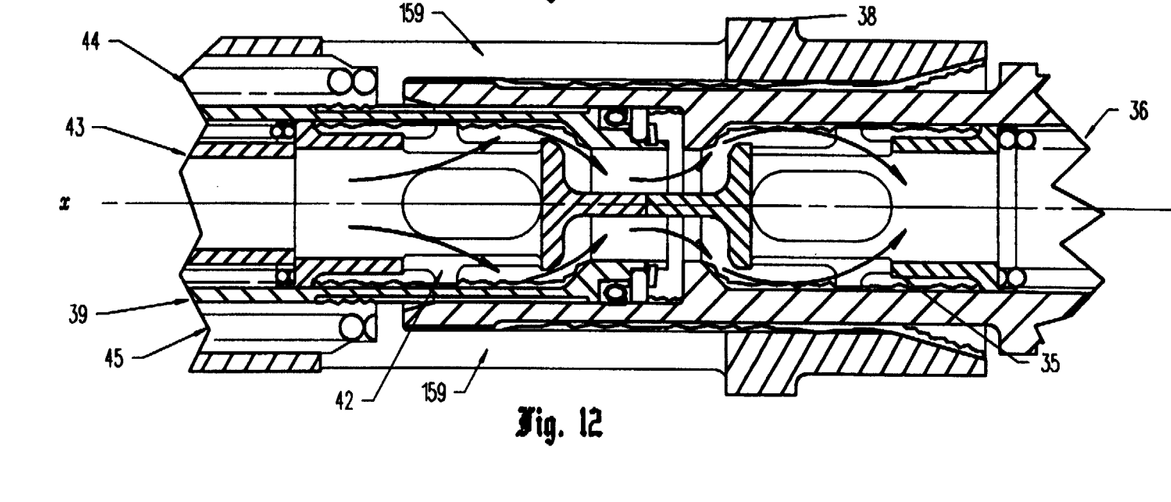
FIG. 12 is a view generally similar to FIG. 11, but depicting the male half lever as having been moved in a clockwise direction so as to displace the male half body rightwardly relative to the male half sleeve, this view depicting both poppets as having been displaced off their seats such that the joined coupling is fully opened.

Operational Sequence (FIGS. 11–12)

Figure 13:
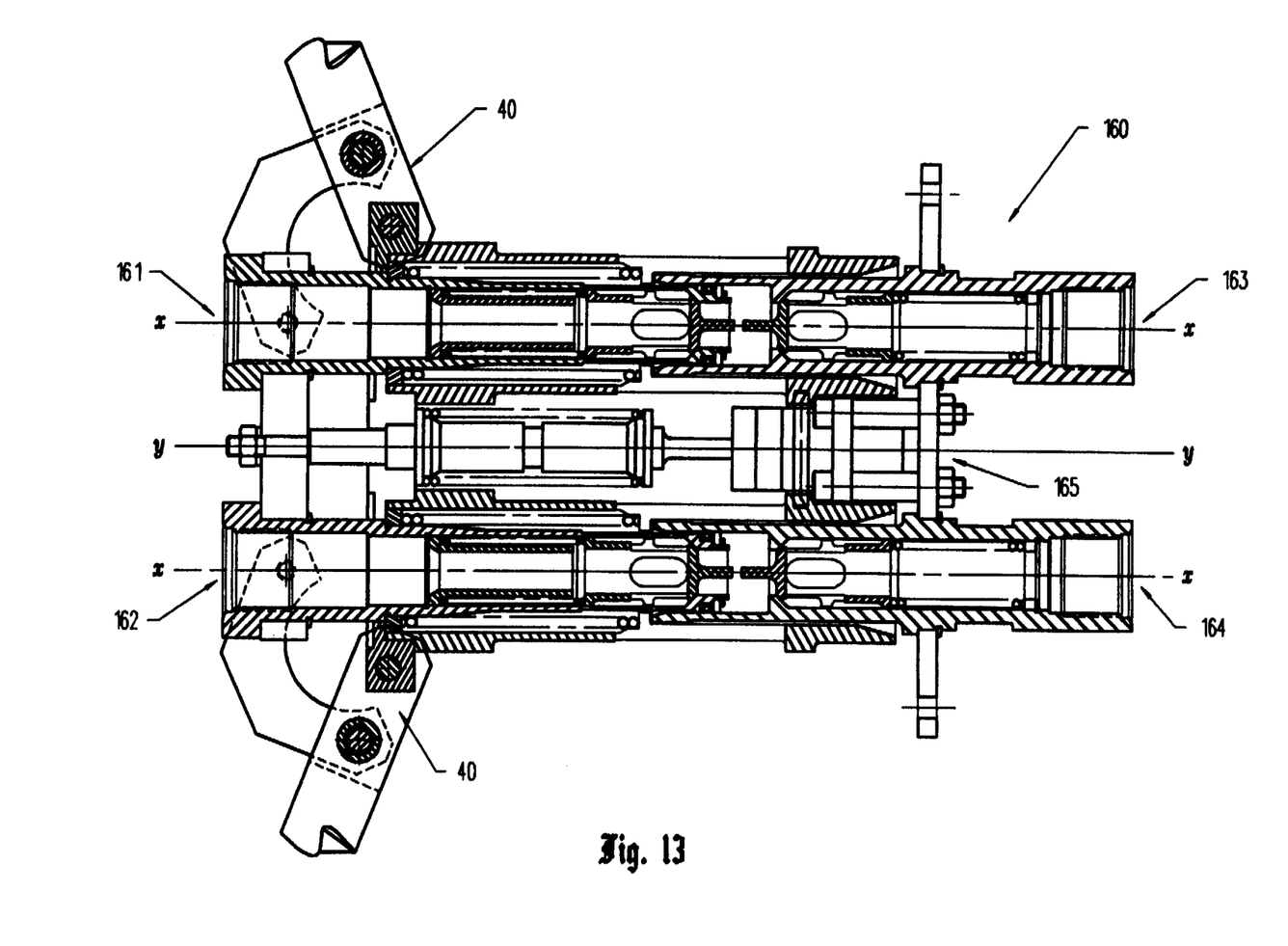
FIG. 13 is a fragmentary longitudinal vertical sectional view of a male filling nozzle and a female receptacle for use in refilling a vehicle with LNG, and also showing the eccentrically-positioned holding mechanism as preventing unintended separation of the male and female coupling halves.

The operational sequence during joinder and separation may be readily appreciated from a comparison of FIGS. 1, 12 and 13.

During joinder, the two separated halves are initially aligned and oriented as generally shown in FIG. 1. Being separated, the respective coupling springs will have urged their associated poppets into fluid-tight sealed engagement with the associated seats on each coupling body. In any event, the two halves are generally aligned in an axial direction, with the right marginal end portion of the male half sleeve being adapted to surround and embrace the left marginal end portion of the female section body when the coupling sections are brought together.

The two coupling halves are then moved axially toward one another. The sharpened annular edge between female body surfaces 46,49 will scrape and remove any ice obstructing the path of movement as the two coupling sections are brought together. This is illustrated in FIG. 11. In this initial position, the right marginal end portion of the male section sleeve serves to continue to guide such insertion. It will also be noted that during this initial insertion, the male and female section poppets remain operatively engaged with their seats. Also, during such initial joinder and insertion, the sharpened edge on the seal retainer scrapes ice adhering to female half body inner surface 58. Thus, during joinder, the sharpened edge of seal retainer 127 scrapes ice adhering to body inner surface 58 ahead of seal 158.

After female half body left end face 46 engages male sleeve shoulder 104, as shown in FIG. 12, lever 40 is moved in a clock,vise direction. This causes the male section body 39 to move rightwardly relative to the sleeve (i.e., to extend). As the male section body moves rightwardly, the distal ends of poppets 35,35' will first abut. As the male half body continues to move rightwardly within the male half sleeve, the two poppets will be displaced axially off their respective seats. In the embodiment shown, male half spring 44 has a lesser spring rate than female half spring 36. Thus, the male section poppet will open first until such time as its shoulder surface 72' abuts the fight end face of stop member 43. Thereafter, continued extension of the male half body relative to the sleeve will subsequently cause the female section poppet to open.

In any event, the sharpened edges defined by poppet surfaces 78,80 and 78',80', will serve to scrape ice adhering to the inside surface of the associated body as the poppet moves away from its seat. To the end, the poppets have been provided with vent openings 81,81', to permit such ice which has been removed to pass through the poppet side wall to an out-of-the-way position.

FIG. 12 illustrates the fully-opened condition of the valve, with ice being formed at certain selected places thereon. This is intended to be illustrative only, and not limitative of the scope of the appended claims.

After the two coupling halves have been joined and opened so as to permit fluid to flow through the connected passageway, ice will form at various portions of the coupling. The extent and nature of such ice formation is variable, and may depend on the temperature of the service fluid, the humidity both within and without the coupling, and on other factors as well. Thus, ice may form at various places, and with various thicknesses, depending on a number of factors.

In any event, to disassemble the fully-opened coupling, shown in FIG. 12, the operator first moves lever 40 in a counter-clockwise direction. As this occurs, the male body begins to retract (i.e., move leftwardly within) the male outer sleeve. Initially, female half poppet 35 moves toward and ultimately engages seat 34, owing to the relative stiffness of spring 36. Thereafter, continued counter-clockwise rotation of lever 40 will permit spring 44 to expand, urging male half poppet 42 toward seat 41. Ultimately, the male section poppet will sealingly engage seat 41. After the two poppets have sealingly engaged their respective seats, the two coupling halves may be separated by further relative axial movement away from one another.

It should be noted that the present invention provides a number of sharp-edged scrapers at critically-important locations on the male and female halves. These scrapers are positioned to scrape and remove ice when the two coupling halves are brought together and joined, as well as when they are separated. One such sharp-edge scraper is defined between female half body left end face 46 and outer surface 49. This edge is adapted to scrape ice adhering to the inner surfaces 105,106 of the male half sleeve when the two sections are joined together. Conversely, the intersection of female half surfaces 49,50 defines a rightwardly-facing edge which is adapted to scrape ice adhering to sleeve surfaces 105,106 when the two coupling halves are separated. The male half sleeve is provided with four horizontally-elongated circumferentially-spaced through-slots, severally indicated at 159, to permit scraped ice to pass therethrough so as not to impede the joinder or separation.

Seal 158 is provided on a protrusion on the right marginal end portion of the male section body. The outermost edge of seal retainer 127 scrapes ice adhering to female body inner surface 58 when the two sections are brought together. Conversely, male half body surfaces 121,122 define a leftwardly-facing sharpened edge which is adapted to scrape ice adhering to female body inner surface 58 when the two sections are removed from one another.

Still further, the two poppets are provided with intermediate and rearward protrusions. These define leftwardly- and rightwardly-facing sharpened edges which are adapted to scrape ice from the associated body inner surface, depending upon the direction of movement. Also, the rightwardmost most protrusions on the poppets serve an additional ice-scraping function. To this end, the poppets are provided with circumferentially-spaced through-slots 81,81', respectively, to permit such scraped ice to enter the poppet, so as to not interfere with operation of the coupling. It should also be noted that poppet protrusions 76,75 also serve to guide movement of the poppet within the associated body. Similarly, sleeve projection 108 serves to guide extension and retraction of the male half body, and to provide an abutment stop for insertion of the female half body.

Thus, the invention provides scrapers and/or guides at critical locations within the coupling halves to remove ice from facing relatively-moveable surfaces, and also provides passages so that the separated ice does not accumulate in an operation-preventing position.

LNG Coupling (FIG. 13)

FIG. 13 illustrates an LNG coupling, generally indicated at 160, which, in large part, comprises a manifolding of the various coupling halves heretofore described. More particularly, two male coupling halves 161,162, are shown as being aligned with two female halves 163,164. These respective coupling halves are as previously described.

Coupling 160 is shown as further including a holding mechanism, generally indicated at 165, for releasably holding the respective coupling halves in a joined position until it is desired that they be separated.

In one form, the two male coupling halves are connected to conduits (not shown) leading to an LNG source, and the two female halves are connected to a vehicular-mounted LNG storage tank. Thus, when it is desired to refuel the vehicle, the coupling halves are joined in the manner heretofore described. Liquified LNG is permitted to flow through one of the connected couplings, and vapor is permitted to return from the tank to the source through the other coupling. If desired, holding mechanism 165 may be operated by, or in conjunction with, levers 40. It should also be noted that the holding mechanism 165 is not concentric with either coupling axis x—x, but is positioned between the two couplings and is elongated along axis y—y. Thus, eccentric position of holding mechanism 165 will reduce freeze-up problems due to its location away from the serviced fluid.

In FIG. 13, the operational sequence during joinder and separation is substantially as heretofore described.

Modifications

The present invention contemplates that many changes and modifications may be made. The specific configuration of the various parts and components may be readily changes as desired. The ice-scraping protrusions may be mounted on either surface so as to extend toward the other. The salient here is that such protrusions that should scrape ice and remove ice from such facing surface during insertion and/or separation. Similarly, sliding seal 158 may be mounted on either member. In many cases, an associated body or member is deliberately provided with openings to permit ice to pass therethrough. Thus, the poppets are provided with openings 81,81′, respectively, and sleeve 38 is provided with slots 159. The number, size and spacing of these various slots and openings may be changed or modified as desired. As used herein, a sharpened edge is one defined by surfaces (i.e., either planar or curved) which meet at an angle of about 90°.

Therefore, while the presently-preferred form of the inventive coupling has been shown and described, and several modifications thereof discussed, persons skilled in this art will readily appreciate the various additional changes and modifications may be made without departing from the spirit of the invention, as defined and differentiated by the following claims.

What is claimed is:

1. In a self-scaling fluid coupling half adapted to convey a fluid at a sub-freezing temperature, said coupling half including a tubular body having an inner surface and an internal annular seat, and including a popper mounted within said body for relative movement toward and away from said seat, the improvement which comprises:

said poppet having an outer surface arranged in spaced facing relation to said body inner surface, and having a plurality of protrusions configured as arcuate segments and extending from one of said body and poppet surfaces toward the other of said surfaces, each protrusion terminating in a distal surface arranged to slidably engage said other surface, and wherein each protrusion has an outer edge configured and arranged as a scraper for removing ice adhering to said other surface when said poppet is moved relative to said body.

2. The improvement as set forth in claim 1 wherein said protrusions are provided on said poppet, and wherein said poppet is a cup-shaped member having a cylindrical side wall provided with a plurality of through-openings adapted to permit ice removed by the outer edges of said protrusions to pass through said poppet side wall.

3. A coupling adapted to convey a fluid at a sub-freezing temperature, comprising:

a female coupling half having a tubular body terminating in a distal end, said female half body having an inner surface, an outer surface and an internal abutment surface;

a male coupling half including an outer tubular sleeve having an inner surface and having an internal shoulder, and including an inner tubular body arranged concentrically within said sleeve for axial movement relative thereto, said male half inner tubular body having a distal end and having an outer surface arranged in spaced facing relation to said sleeve inner surface so as to form an annular recess therebetween which extends between said male half body distal end and said sleeve shoulder, the distal marginal end portion of said female half body being axially insertable into said male section recess until said female half body distal end abuts said male half sleeve shoulder to initially join and align said coupling halves;

a holding mechanism for preventing unintended separation of said coupling halves; and a force-multiplying mechanism for selectively moving said male half body relative to said male half sleeve in a direction toward said female half abutment surface after said halves have been held in such initially-joined position.

4. A coupling as set forth in claim 3 wherein a portion of said female half body outer surface is configured as a sharp-edged scraper for removing ice adhering to the inner surface of said male half sleeve when said male and female halves are moved relative to one another.

5. A coupling as set forth in claim 4 wherein said male half sleeve is provided with a plurality of vent openings to allow ice removed by said scraper to pass through said sleeve.

6. A coupling as set forth in claim 3 and further comprising: a protrusion mounted on one of said female half inner surface and male half outer surface to slidably engage the other of said surfaces to seal the joint between said surfaces.

7. A coupling as set forth in claim 6 and further comprising: a sliding seal mounted on said protrusion to engage said other surface.

8. A coupling as set forth in claim 7 and further comprising: a seal retainer associated with said sliding seal, and wherein said seal retainer has a portion configured as a sharp-edged scraper adapted to remove ice adhering to said other surface when said bodies are moved in one axial direction relative to one another.

9. A coupling as set forth in claim 8 wherein said male half body member has a portion configured as a sharp-edged scraper arranged to remove ice adhering to said female half body inner surface when said bodies are moved in the opposite axial direction relative to one another.

10. A coupling as set forth in claim 3 and further comprising a plurality of protrusions, severally configured as arcuate segments, mounted on one of said coupling halves in said recess and extending toward the other of said coupling halves, each protrusion having an outer edge configured and arranged as a scraper for removing ice adhering to said other coupling half.

11. In a fluid coupling adapted to convey fluid at a sub-freezing temperature, said coupling having a first member provided with a concave arcuate surface generated about an axis and having a second member provided with a coaxial convex arcuate surface arranged in spaced facing relation to said concave arcuate surface, said members being mounted for relative axial movement, the improvement which comprises:

a protrusion extending from one of said arcuate surfaces toward the other of said arcuate surfaces, said protrusion having a first side surface facing in one axial direction and having a second side surface facing in the opposite axial direction, said protrusion also having a coaxial distal arcuate surface slidably engaging said other arcuate surface and joining the margins of said first and second side surfaces, said first side surface defining with said distal arcuate surface a first edge adapted to scrape ice adhering to said other arcuate surface when the protrusion-carrying member is moved in said one axial direction relative to the other member, and said second side surface defining with said distal arcuate surface a second edge adapted to scrape ice adhering to said other arcuate surface when the protrusion-carrying member is moved in said opposite axial direction, the radial height of said protrusion being sufficient to define a space between said concave and convex surfaces to receive scraped ice;

whereby the area in sliding contact between said members may be reduced.

12. The improvement as set forth in claim 11 and further comprising: a sliding seal operatively mounted on said protrusion, and arranged to slidably engage said other arcuate surface.

13. The improvement as set forth in claim 12 wherein an annular recess extends into said protrusion from said distal arcuate surface, and wherein said sliding seal includes a seal member and a spring element arranged in said recess and engaging said other arcuate surface in sealed sliding engagement.

14. The improvement as set forth in claim 12 and further comprising: a seal retainer mounted on said protrusion and providing a lateral restraint for said seal, said seal retainer having one of said edges.

15. The improvement as set forth in claim 11 wherein each of said side surfaces intersects said distal outer surface at an included angle of about 90°.

16. The improvement as set forth in claim 11 and further comprising: a plurality of said protrusions, and wherein said protrusions are arranged as arcuate segments.

17. The improvement as set forth in claim 11 wherein said first member is a body and wherein said second member is a poppet.

18. The improvement as set forth in claim 11 wherein said first member is a female coupling half body, and wherein said second member is a male coupling half body.

19. The improvement as set forth in claim 18 and further comprising: a tubular sleeve surrounding said male coupling half body, said sleeve having a tapered inner surface adapted to envelop the distal marginal end portion of said female coupling half body, said sleeve having a plurality of internal arcuately-segmented protrusions terminating in arcuate distal end surfaces arranged in closely-spaced facing engagement to said male half body outer surface, said protrusions having sharp edges adapted to remove ice adhering to said male half body convex surface when said male half sleeve and body are moved axially relative to one another, and wherein said sleeve has a plurality of slots to allow removed ice to pass therethrough.

20. The improvement as set forth in claim 19 and further comprising: a lever operatively arranged to move said male half body relative to said sleeve.

21. The improvement as set forth in claim 20 and further comprising: a holding mechanism for preventing unintended separation of said male and female coupling halves.

22. The improvement as set forth in claim 21 wherein said holding mechanism is located at a position eccentric to the axis of said coupled male and female halves.

23. In a fluid coupling adapted to convey fluid at a sub-freezing temperature, said coupling having a first member provided with a concave arcuate surface generated about an axis and having a second member provided with a coaxial convex arcuate surface arranged in spaced facing relation to said concave arcuate surface, said members being mounted for relative axial movement, the improvement which comprises:

a protrusion extending from one of said arcuate surfaces toward the other of said arcuate surfaces, said protrusion having a first side surface facing in one axial direction and having a second side surface facing in the opposite axial direction, said protrusion also having a coaxial distal arcuate surface slidably engaging said other arcuate surface and joining the margins of said first and second side surfaces, said first side surface defining with said distal arcuate surface a first edge adapted to scrape ice adhering to said other arcuate surface when the protrusion-carrying member is moved in said one axial direction relative to the other member, said second side surface defining with said distal arcuate surface a second edge adapted to scrape ice adhering to said other arcuate surface when the protrusion-carrying member is moved in said opposite axial direction, a tubular sleeve surrounding said first member in spaced relation thereto, said sleeve having a tapered inner surface adapted to envelop the distal marginal end portion of said second member, said sleeve having a plurality of internal arcuately-segmented protrusions terminating in arcuate distal end surfaces arranged in closely-spaced facing engagement to said first member outer surface, said protrusions having sharp edges adapted to remove ice adhering to said first member convex surface when said first member sleeve and body are moved axially relative to one another, and wherein said sleeve has a plurality of slots to allow removed ice to pass therethrough;

whereby the area in sliding contact between said members may be reduced.

* * * * *